May 19, 1925. 1,538,613
T. B. BOMAR
WHEEL TIGHTENER
Filed Nov. 3, 1923 2 Sheets-Sheet 1
Fig. 1.
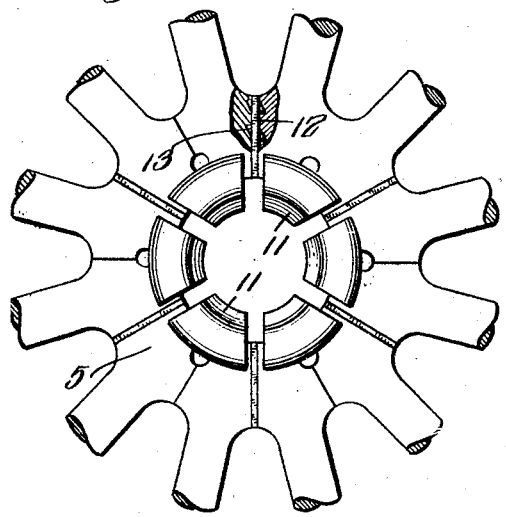
Fig. 9.
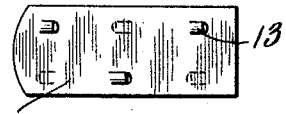
Fig. 10.
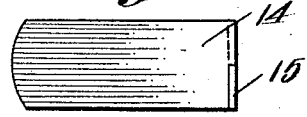
Fig. 11.
Fig. 12.
Fig. 13.
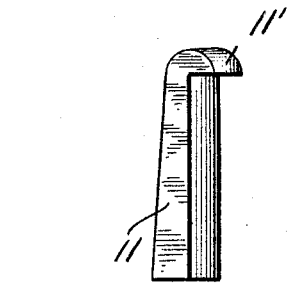
Fig. 2.
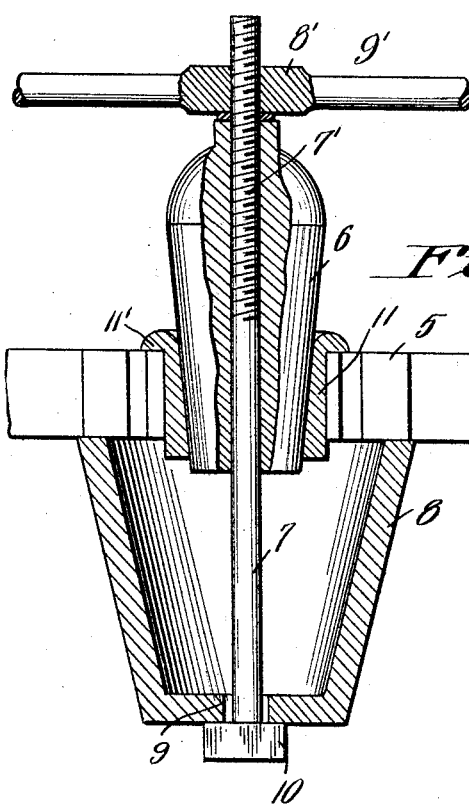
Fig. 3.
T. B. Bomar,
Inventor
By C. A. Snow & Co.
Attorney May 19, 1925.
T. B. BOMAR
WHEEL TIGHTENER
Filed Nov. 3, 1923
1,538,613
2 Sheets-Sheet 2
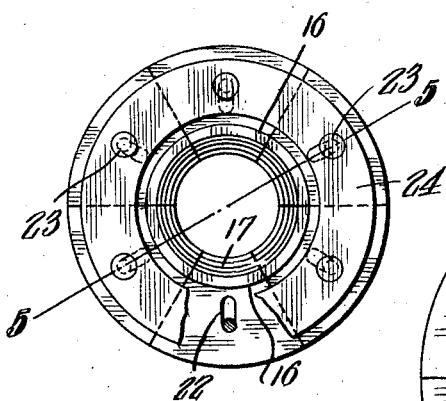
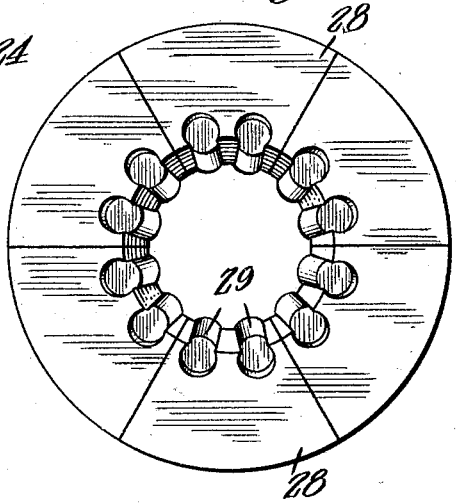
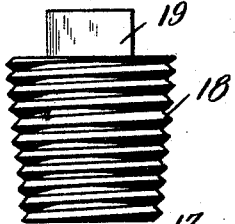
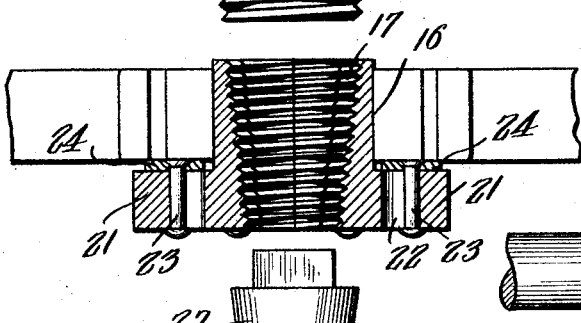
T. B. Bomar, Inventor
By C. A. Snow & Co.
Attorneys Patented May 19, 1925.

1,538,613

UNITED STATES PATENT OFFICE.

THOMAS B. BOMAR, OF DALLAS, TEXAS.

WHEEL TIGHTENER.

Application filed November 3, 1923. Serial No. 672,661.

*To all whom it may concern:*

Be it known that I, THOMAS B. BOMAR, a citizen of the United States, residing at Dallas, in the county of Dallas and State of Texas, have invented a new and useful Wheel Tightener, of which the following is a specification.

The present invention relates to a device for reconditioning vehicle wheels, the primary object of the invention being to provide novel means for tightening the wheel.

Another important object of the invention is to provide means to be inserted in the hub of the wheel to expand the spokes to force the outer ends thereof into the spoke openings formed in the usual felloe.

A still further object of the invention is to provide means to be positioned in the spaces formed between the spokes to hold the spokes against movement after the tightening device has been operated.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view disclosing the inner ends of spokes after the expanding wedges have been applied.

Figure 2 is a longitudinal sectional view through one form of expanding device.

Figure 3 is an elevational view of one of the plates employed in connection with the expanding device.

Figure 4 is a plan view of a modified form of expanding device.

Figure 5 is a sectional view taken on line 5—5 of Figure 4.

Figure 6 is a vertical sectional view through a further modified form of the invention.

Figure 7 is a plan view of the cone receiving member as shown by Figure 6 of the drawings.

Figure 8 is an elevational view of the wrench or operating handle forming a part of the device.

Figure 9 is a side elevational view of one of the filler plates.

Figure 10 is a modified form of one of the filler plates.

Figure 11 is an edge elevational view of a filler plate as shown by Figure 10.

Figure 12 is a side elevational view of a further modified form of a filler plate.

Figure 13 is an edge elevational view thereof.

Referring to the drawings in detail, the inner ends of the spokes of a wheel are indicated at 5, which spokes are acted on by the expanding cone 6 formed with a central bore to receive the screw 7.

Forming a part of the expanding device is a hollow body portion 8 formed with an opening 9 through which the bolt extends, there being provided a head 10 on the lower end of the bolt 7 to engage the body portion 8.

The upper end of the screw is threaded at 7' to extend into the threaded opening of the enlargement 8' of the handle 9' so that rotary movement of the handle 9' will operate to draw the head 10 upwardly and force the cone 6 downwardly to accomplish the purpose of the invention.

Used in connection with the expanding cone 6 are the protecting plates 11 formed with laterally extending portions 11' and which have their inner and outer edges curved to conform to the curvature of the hub opening of a wheel, the inner edges of the plates being inclined to engage the tapered surface of the cone and set up a wedging action to cause the spokes with which the device is employed to move laterally and firmly position themselves in the usual spoke opening of the felloe associated therewith.

It is obvious that when the body portion 8 is positioned as shown by Figure 2 of the drawings and the expanding cone 6 is moved longitudinally of the screw 7, the spokes will be separated at points adjacent to their hubs in which spaces may be positioned the filling plates which are indicated at 12 and provided with means such as spurs 13 to embed themselves in the adjacent faces of spokes when the expanding device has been removed.

In the form of plate as shown by Figures 10 and 11, the plate is indicated at 14 and has flanges 15 formed at one end thereof, the flanges being disposed in opposite directions to engage portions of the adjacent spokes between which the plate is positioned, to hold the plate against accidental displacement.

The plate shown by Figures 12 and 13 has corrugations 15' formed in the side faces thereof, which corrugations provide roughened surfaces to create a binding action between adjacent spokes and prevent movement thereof. The spoke tightener as shown by Figures 4 and 5 is especially designed for light work and includes a plurality of sections 16 that are formed with inclined threaded inner surfaces 17 that receive the tapered plug 18 which is formed with a squared extremity 19 to be engaged by the wrench 20 whereby the plug 18 may be rotated within the threaded opening formed by placing the sections 16 in proximity with each other as shown by Figure 5.

Each of these sections includes a flange 21 formed with an elongated opening 22, the openings 22 of the flanges being provided to accommodate the bolts 23 that have connection with the supporting washer 24, whereby the sections are permitted to move laterally with respect to each other when the plug 18 has been positioned to expand the sections. Thus it will be seen that when the sections are positioned as shown by Figure 5 and the plug 18 is positioned therein, the movement of the plug through the opening formed between the sections will cause the sections 16 to move laterally and force the spokes into the felloe openings as previously described.

When the spokes have been tightened within their felloe, plates as previously described are positioned within the spaces formed between the spokes to hold the spokes in their expanded positions.

The expander shown by Figures 6 and 7 includes a body portion 25 formed with a threaded opening to receive the screw 26, the screw accommodating the cone-shaped expander 27 in a manner so that as the screw 26 is rotated, the cone 27 will be moved longitudinally thereof, the nut 12' contacting with the lower end of the body portion 25.

Associated with the member 27 is a sectional expanding member 28 each of which sections are formed with curved cut out portions to receive the rollers 29 that engage the member 27 to reduce friction between the member 27 and sectional expanding member 28 when the cone is being moved into the member 28.

I claim:—

In a device for tightening wheels, protecting plates having inclined inner surfaces and having laterally extended portions adapted to engage the spokes of the wheel, a hollow body portion adapted to engage the spokes, a bolt extending through the hollow body portion, an expanding member adapted to be positioned between the protecting plates, said bolt adapted to extend through the expanding member, and means on the bolt and adapted to engage the expanding member to force the expanding member between the protecting plates, and one end of the expanding member adapted to pass into the hollow body portion.

In testimony that I claim the foregoing as my own, I have hereto affixed my signature in the presence of a witness.

THOMAS B. BOMAR.

Witness:
Mrs. ETNA BRADLEY.